Figure 5:
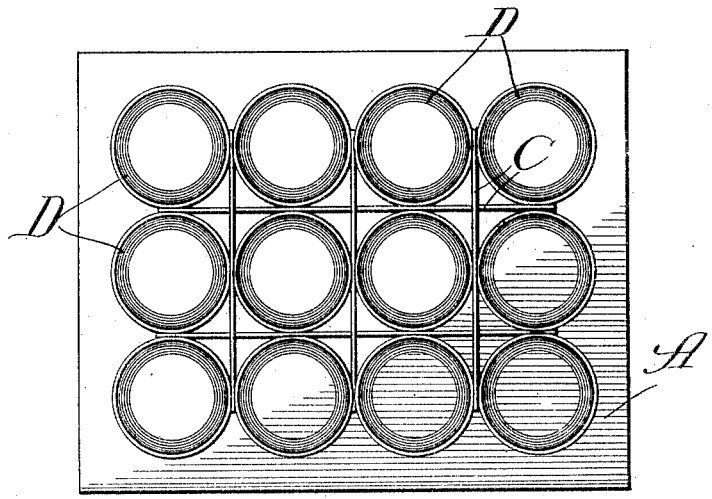

No. 776,777. PATENTED DEC. 6, 1904.
C. F. DIETZ.
ART OF MAKING BREAD.
APPLICATION FILED JULY 5, 1904.
NO MODEL. 2 SHEETS—SHEET 1.
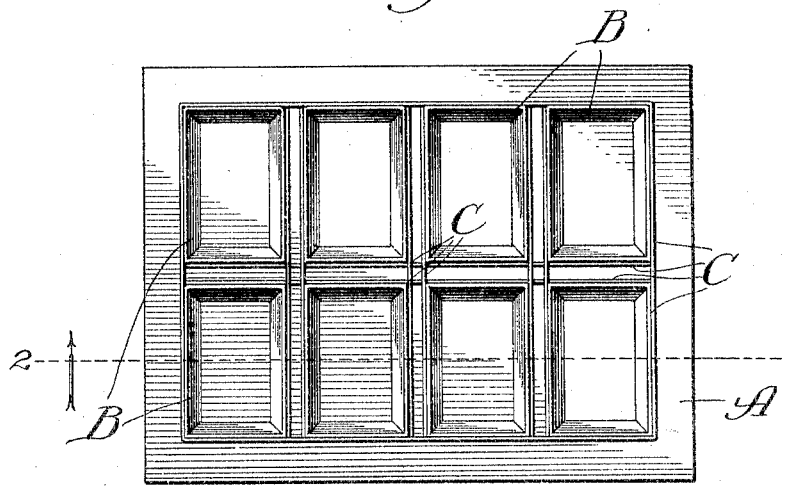
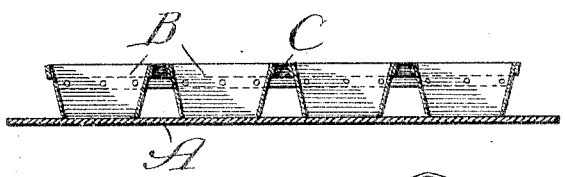
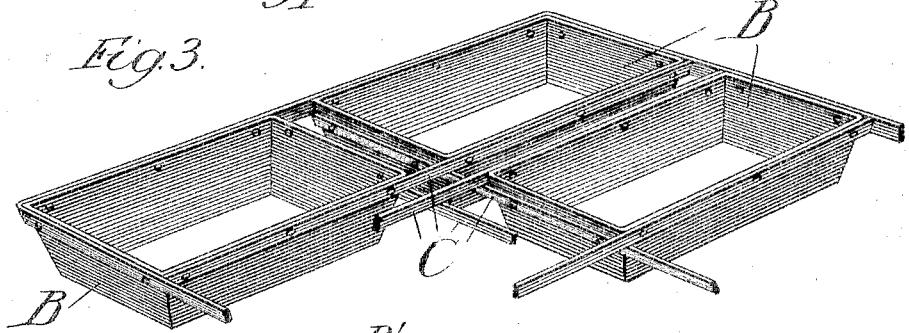
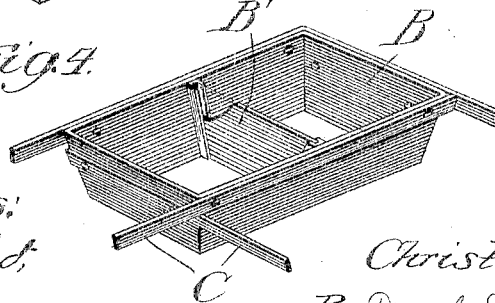
Witnesses:
Inventor:
Christian F. Dietz,
By Dyrenforth, Dyrenforth and Lee,
Attys.

No. 776,777. PATENTED DEC. 6, 1904.
C. F. DIETZ.
ART OF MAKING BREAD.
APPLICATION FILED JULY 5, 1904.
NO MODEL. 2 SHEETS—SHEET 2.

Witnesses
Chas. E. Gaylord.
Harry F. Strott.

Inventor:
Christian F. Dietz,
By Dyrenforth, Dyrenforth & Lee
Attys.

No. 776,777.

Patented December 6, 1904.

UNITED STATES PATENT OFFICE.

CHRISTIAN F. DIETZ, OF CHICAGO, ILLINOIS.

ART OF MAKING BREAD.

SPECIFICATION forming part of Letters Patent No. 776,777, dated December 6, 1904.

Application filed July 5, 1904. Serial No. 215,256. (No model.)

*To all whom it may concern:*

Be it known that I, CHRISTIAN F. DIETZ, a citizen of the United States, residing at 3013 Keeley street, Chicago, in the county of Cook and State of Illinois, have invented a new and useful Improvement in the Art of Making Bread, of which the following is a specification.

My invention relates to an improved method of and means for preparing loaves of dough for baking them into bread.

In a separate application for Letters Patent filed by me November 30, 1903, Serial No. 183,147, I described and claimed a new and improved method of preparing a loaf from a lump of dough, consisting in shaping and compacting the lump by frictionally stretching and drawing the skin portion of the lump toward and applying the surplus thereof to one side, more especially the under side, of the finished loaf. By practicing the method thus broadly defined the loaf when baked results in bread particularly attractive in appearance and of a most desirable quality. To accomplish uniformly the best results, it is necessary that the steps of the method be practiced with specially-devised apparatus, and in connection with the said application an illustration was given of a machine in which the lumps of dough were acted upon by rollers in a peculiar manner. In another application for Letters Patent filed by me May 31, 1904, Serial No. 210,416, I described and claimed a method to all intents and purposes like that of my first said application, but including as a step in the formation of the loaf the subjection of each lump of dough at one side (the under side) to reciprocating frictional drawing action for the purpose of stretching the skin portion, applying the surplus skin to said side, and, as a consequence, compacting and shaping the lump. For carrying out this later method, which is within the spirit of the invention defined by the broader claims of the first said application, and therefore subordinate thereto, I showed and described apparatus comprising a series of dough-confining receptacles and a reciprocal platform having a friction-surface forming a base for the receptacles. In the practice of each of my aforesaid methods, as described in the applications, the loaves when prepared by the apparatus were removed therefrom, leaving it to be understood that the loaves were then placed in baking-pans in the usual manner to undergo therein the final fermentation, which ceases only when the loaves have been placed in the oven.

My present object is to provide certain improvements upon or relating to my aforesaid methods, which dispense with the necessity of removing the loaves before baking from the apparatus employed for preparing them, thereby greatly reducing the labor incident to bread making and rendering more certain the attainment of uniformly desirable results.

In the practice of my present invention I employ a plate or platform suitable for use with other appliances in carrying out the aforesaid methods of preparing loaves and which operates also with or without additional appliances as a support for the loaves while they are being baked.

In the accompanying drawings I illustrate various forms of apparatus, all operating upon the same principle and designed for use in preparing variously-shaped loaves.

Referring to the drawings, Figure 1 is a plan view of devices adapted for forming rectangular loaves; Fig. 2, a section on line 2 in Fig. 1; Fig. 3, an enlarged broken perspective view of loaf forming and baking receptacles of the type shown in Fig. 1; Fig. 4, a broken perspective view of a loaf forming and baking receptacle for use in making "double" or "twin" loaves; Fig. 5, a plan view of apparatus designed for forming and baking loaves round in horizontal cross-section, and Fig. 6 a plan view of apparatus for use in turning out oblong loaves or loaves of the Vienna type.

A is a plate or platform, which may be of metal to withstand the heat of a baker's oven.

B B are a series of receptacles riveted to connecting-bars and braces, whereby a series of the receptacles are connected together in a single device or frame C. The receptacles have no bottoms; but when resting upon the plate A the latter, which is of somewhat larger dimensions than the frame C, forms a base for all the receptacles.

In operation scaled lumps of finished dough are dropped into the receptacles B onto the surface of the plate A and caused to rest in frictional contact with the latter. The plate A may rest immovably upon a support, and the frame C is reciprocated upon the said plate. In the movement of the frame in one direction a wall of each receptacle engages the lump therein and moves it along while in frictional contact with the plate. The operation is carried on in a manner to avoid rotation of the lump and to drag the lump upon the friction-surface, whereby the skin portion at the side of the lump opposite the wall then bearing against the lump is stretched to the under side thereof. When the frame is slid in the opposite direction, the same action takes place at the opposite side of each lump, the effect being to stretch the skin at one side and then the other from the tops of the lumps to the under sides, applying the surplus skin to the said under sides of the lumps. The reciprocation of the frame may be within short limits, sufficient only to move and rock the lumps from side to side, and a comparatively few reciprocations will result in stretching the skin at opposite sides to the desired extent and, as a result of the stretching, produce the desired compacting of the lumps. After reciprocating the frame to shape the sides of the loaves the reciprocation may be repeated at right angles to the first direction of movement to shape the ends of the loaves and stretch the skin portions thereat in the same way. On completion of this forming operation the lumps or loaves will be of dimensions in horizontal cross-section somewhat less than the dimensions of the receptacles. When allowed to remain in the receptacles formed by the frame C and plate A, the loaves will in a short time expand under the action of final fermentation to fill out the receptacles. When this occurs, the plate A, with the receptacles and loaves thereon, is passed into the oven, and the bread thus baked without removal from the forming apparatus.

If desired, the frame C, including the receptacles B, may be stoutly constructed of metal with the receptacle sides enameled or otherwise prepared to prevent dough from sticking thereto. Bottomless baking-pans B, either in a frame or otherwise, of a thinner material more suitable for the baking operation may be caused to replace the frame and forming-receptacles described immediately after the forming operation, in which the loaves may expand, as described, and be baked. In either event the loaves of dough remain upon the plate A, which is a great advantage, for the reason that any handling to which the formed loaves are subjected is apt to cause rupture of the skin portion. Furthermore, as such handling must be done with care it constitutes a material item in the cost of making the bread.

In the construction shown in Fig. 5 the frame C contains receptacles D of circular form. In the use of this apparatus the lumps of dough placed in the receptacles may be subjected to circular as well as, or instead of, back and forth movement. The action upon the lumps of dough is the same as that in the formation of rectangular loaves, the skin portion of the lumps being stretched and applied to the under sides with consequent compacting of the lumps. The receptacles shown may be the baking-receptacles as well as the forming-receptacles, or they may be substituted upon the plate A by thinner baking-receptacles before the final swelling of the loaves takes place. In this case, like the first described, the plate A supports the loaves while they are being baked.

Figure 6:
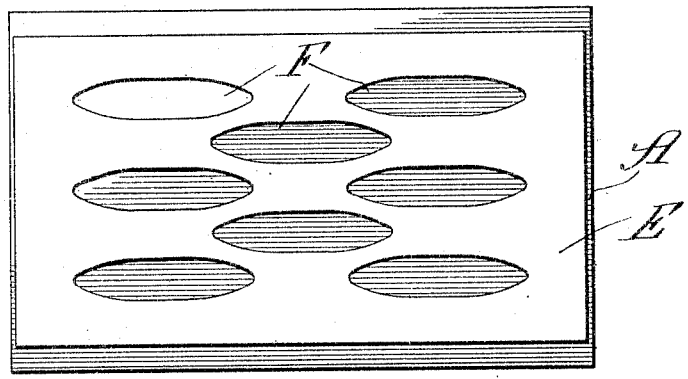

The construction shown in Fig. 6 is intended more especially for employment in the production of what are generally designated as "Vienna" loaves, which are not baked in pans. A frame or block E is formed with compartments or receptacles F and may be reciprocated upon the plate A to form the lumps into loaves in the manner described. When the forming operation is completed, the block E is removed, leaving the loaves upon the plate A. Characteristic slits may be cut at intervals along the loaves and the latter left to undergo "proofing" or final fermentation merely while resting upon the plate A, after which the said plate, with the loaves thereon, is passed into the oven to bake the bread.

In practice the plates A need be of dimensions but slightly in excess of those of the frames or blocks containing the forming-receptacles, because repeated movement within but short limits is all that is necessary to form the loaves, as described. A frame or block may contain any desired number of forming or forming and baking receptacles, and the latter may be of any desired dimensions.

In the construction shown in Fig. 4 the receptacle B contains a removable partition B'. A lump of dough is placed in each compartment of the receptacle, and after the forming operation the partition is removed to permit the loaves to swell into contact, thus resulting in what is known, as before stated, as "twin" or "double" loaves.

Naturally the reciprocating or other movement of the frame upon the plate A may be produced either by hand or mechanical means without departing from the spirit of the invention. If desired, the plate A may be moved, while the frame and receptacles remain stationary, to produce the forming of the loaves.

My invention, both as to procedure and apparatus, may be changed in various ways in the matter of details without departing from the scope of my invention as defined in the appended claims.

What I claim as new, and desire to secure by Letters Patent, is—

1. The herein-described method of making a loaf of bread from a lump of finished dough, which consists in confining the lump upon a friction-surface, subjecting it at its side adjacent to said surface to reciprocating frictional drawing action against it, thereby stretching the skin portion of the dough toward said side and compacting the lump, and then baking the lump without removal from said surface.

2. The herein-described method of making a loaf of bread from a lump of finished dough, which consists in confining the lump, upon a friction-surface, subjecting it at its under side to reciprocating frictional drawing action against it, thereby stretching the skin portion of the dough toward said under side and compacting the lump, and then baking the lump without removal from said confines.

3. In apparatus for making a loaf of bread from a lump of finished dough, the combination of a portable baking-platform and a bottomless dough-forming receptacle thereon, the platform and receptacle being movable one with relation to the other to form the loaf, substantially as and for the purpose set forth.

4. In apparatus for making loaves of bread from lumps of finished dough, the combination of a portable baking-platform and a frame formed with a plurality of bottomless dough-forming receptacles to rest upon the platform, the platform and frame being movable one with relation to the other to form the loaves, substantially as and for the purpose set forth.

5. In apparatus for making loaves of bread from lumps of finished dough, the combination of a portable baking-platform, a frame formed with a plurality of bottomless dough-forming receptacles resting upon the platform, and removable partitions in the receptacles, the platform and frame being movable one with relation to the other to form the loaves, substantially as and for the purpose set forth.

CHRISTIAN F. DIETZ.

In presence of—
WALTER N. WINBERG,
F. M. WIRTZ.